July 15, 1958
G. MEYER ET AL
2,842,975
APPARATUS FOR CONTROLLING THE PRESSURE FLUID
ACTUATING A REVERSIBLE POWER TRANSMISSION
Filed Jan. 18, 1956
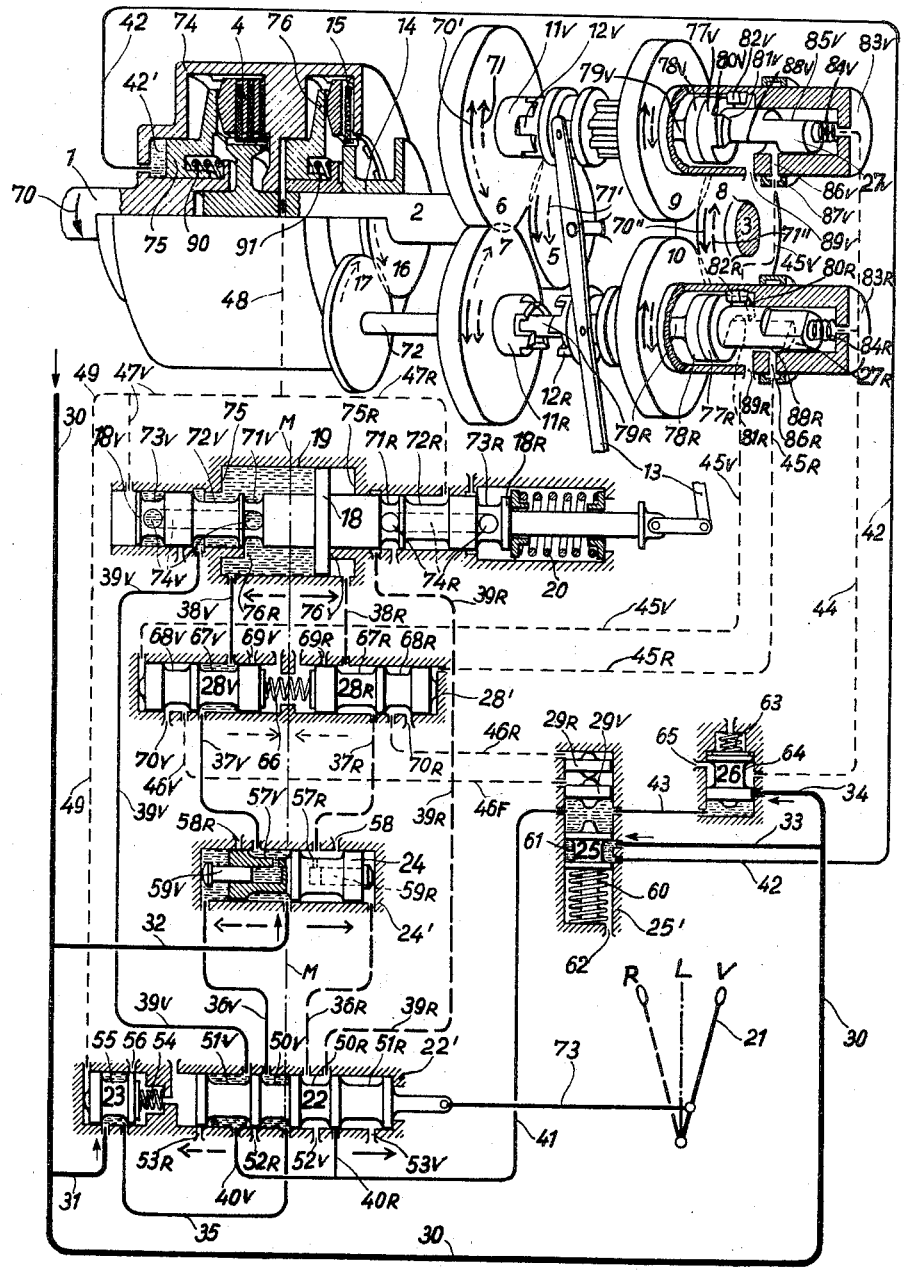
INVENTORS:
GUSTAV MEYER
HERMANN GROS
FRIDOLIN KÖPF
BY
K. A. Mayr
ATTORNEY

United States Patent Office 2,842,975
Patented July 15, 1958

2,842,975

APPARATUS FOR CONTROLLING THE PRESSURE FLUID ACTUATING A REVERSIBLE POWER TRANSMISSION

Gustav Meyer, Hermann Gros, and Fridolin Köpf, Friedrichshafen, Germany, assignors to Maybach-Motorenbau G. m. b. H., Friedrichshafen, Germany, a German firm Application January 18, 1956, Serial No. 559,981

Claims priority, application Germany January 20, 1955

7 Claims. (Cl. 74—361)

The present invention relates to a mechanism for controlling the pressure fluid actuating a reversible power transmission, particularly a reversible power and speed reducing transmission for power boats and ships, for example, as disclosed in Patent No. 2,762,230.

The power transmission is coupled by means of a coupling with a prime mover and includes a reversing clutch, for example, a claw clutch having inclined claw faces of the type disclosed in Patent No. 2,667,252. The transmission is provided with an auxiliary drive which can be temporarily connected with the driving engine or prime mover by means of a clutch, preferably a friction clutch, for reversing the direction of rotation of the driving half of the transmission and for synchronizing the rotation of the driving half with the driven half of the transmission.

The control mechanism according to the invention includes the following elements:

(a) A selecting valve;

(b) A reversing valve controlled by the selecting valve for controlling the flow of a pressure fluid to a hydraulic reversing cylinder containing a piston for actuating a forward drive clutch and a reversing clutch;

(c) First valve means whose movement depends on the extent of travel of the control mechanism for temporarily directing pressure fluid into the synchronizing clutch and for controlling the flow of pressure fluid through the selecting slide valve at the end of the control movement for engaging the main clutch;

(d) A second valve means for blocking the flow of pressure fluid to the selecting valve during the synchronizing operation.

It is an object of the invention to provide a sturdy and relatively simple control of a reversing device which immediately responds at any operating condition and which automatically eliminates all disorders, particularly during the synchronizing operation.

The system according to the invention provides the particular advantage that actuation of a selecting lever and consequently of a selecting valve and of a reversing valve is ineffective during the synchronizing operation so that synchronization and sliding of the inclined claw faces of the claw clutch halves along each other until the claw flanks are engaged takes place without any disturbance. Since this takes only very little time, maneuverability of the vessel or vehicle is considerably improved.

In an embodiment of the invention the device for blocking the flow of pressure fluid to the selecting valve consists of a slide valve which is moved into blocking position by the fluid pressure which engages the synchronizing clutch.

The slide valve for blocking the main actuating pressure is preferably returned by a spring to the unblocking position after the synchronization.

In reversing transmissions whose reversing clutch is placed in middle position by springs when there is no fluid pressure in the hydraulic cylinder operating the forward drive and reversing clutches, two clutch engagement preventing means are provided, one blocking engagement of the selected clutch in dependence on the relative direction of rotation of the two clutch halves and the other unblocking engagement of the selected clutch upon reversal of the relative direction of rotation of the two clutch halves. Each of these engagement blocking means may essentially consist of a rotary blocking valve and a blocking slide valve.

In an embodiment of the invention both blocking valves are arranged in the pipe lines between the reversing valve and the reversing cylinder and block the flow of pressure fluid to the reversing cylinder and control the pressure in a main clutch servo-valve controlling the flow of pressure fluid to a hydraulic device actuating the main clutch. The blocking valves may be actuated in dependence on the blocking pressure effected by the rotary blocking valve which is responsive to the direction of the relative rotation of the driving and driven parts of the selected clutch. The arrangement is particularly suitable not only when reelecting the previous direction of movement of the vessel or vehicle but also during a state of movement of the transmission used in connection with single engine plants which stand still or are idling (neutral position of the transmission) which state of movement is caused at the driven half of the transmission as for example when a vessel is moved by currents or when the vehicle is pulled by other vehicles. The arrangement according to the invention, however, is particularly suitable for multiple engine plants because the blocking mechanism prevents engagement of the halves of the selected clutch until the halves have the correct relative rejecting direction of rotation so that connection of the not yet used engine is effected without disturbance and clashing of the claws.

The aforedescribed engagement blocking devices may also be provided, additionally, if desired, for reversing from one direction of movement of the vessel or vehicle to the opposite direction so that ratching noise is prevented during the synchronization.

The novel features which are considered characteristic of the invention are set forth with particularity in the appended claims. The invention itself however and additional objects and advantages thereof will best be understood from the following description of embodiments thereof when read in connection with the accompanying drawing, the one figure of which is a diagrammatic partly sectional and partly perspective illustration of a mechanism according to the invention.

The reversing transmission comprises two three-part gear sets which are arranged on the driving side and on the driven side of the transmission on a main shaft assembly and on two auxiliary shaft assemblies. Numeral 1 designates a portion of a main shaft and numeral 2 designates an intermediate shaft, both on the driving side, numeral 3 designating a main shaft portion on the driven side of the transmission. A main driving clutch 4 is operably interposed between the shafts 1 and 2. A toothed wheel 5 is mounted on the end of the intermediate shaft 2, the teeth of wheel 5 mating with the teeth of a gear 6 mounted on an auxiliary shaft. The teeth of the wheel 6 match with the teeth of a gear 7 on an auxiliary shaft 72. The gears 5, 6, 7 form the driving wheel set of the reversing gear. The driven wheel set comprises a gear 8 mounted on the driven shaft portion 3, a gear 9, the wheel 8 and mounted on a first auxiliary shaft, and a gear 10 also meshing with the gear 8 being mounted on a second auxiliary shaft. The gears 6 and 9 on the first auxiliary shaft set are connectable by means of a rejecting forward drive claw clutch 11V, 12V and the gears 7 and 10 on the second auxiliary shaft set are connectable by means of a rejecting reversing claw clutch 11R and 12R. The gears 5, 6, 9, 8 produce rotation of the driven shaft 3 in the same direction as the drive shaft 1 (solid line arrows 70, 70' 70") and the gears 5, 6, 7, 10, 8 produce rotation of the driven shaft 3 in a direction opposite to that of the drive shaft 1 (dotted line arrows 71, 71', 71"). When the shaft 3 rotates in the same direction as the drive shaft 1, the vessel or vehicle moves forward and a control lever 21 is in the position "V"; when the shaft 3 rotates in the direction opposite to that of the drive shaft 1, the vessel or vehicle moves backward, the control lever 21 being in the position "R."

The clutches 11V, 12V and 11R, 12R form a reversing transmission which is reversible by means of a lever 13. A synchronizing friction clutch 15 is interposed between the main shaft portion 1 and a hollow shaft 14 surrounding the main shaft portion 2, a gear 16 being mounted on the hollow shaft 14. The teeth of the gear 16 engage the teeth of a wheel 17 mounted on an auxiliary shaft 72 on which the gear 7 is mounted. The claw clutch half 11R is rigidly connected with the gear 7. The elements 14, 15, 16, 17 together with the gears 6 and 7 of the reversing gear form a synchronizing device 1, 15, 14, 16, 17, 72 for reversing the direction of rotation of the driving clutch halves 11V and 11R.

The following is a description of the control apparatus for the pressure fluid:

The reversing lever 13 is linked to an actuating piston 18 in a hydraulic cylinder 19. A spring 20 moves the piston 18 and the clutch halves 12V and 12R into the middle position as long as there is no pressure fluid acting on the piston 18. The latter is provided at either side with an extension shaped to form slide valves 18V and 18R.

The control or selecting lever 21 can be moved into three position: "V" for forward drive, "R" for reversed drive, and "L" for idling or stop. A link 73 connects the lever 21 with a selecting valve 22. A main fluid pressure blocking valve 23 is adapted to block flow of pressure fluid to the selecting valve during synchronization of the reversing transmission. The flow of pressure fluid to the cylinder 19 is controlled by means of a reversing valve 24. Numeral 25 designates a servo-valve for the main clutch 4 and numeral 26 designates a servo-valve for blocking engagement of the reversing clutches.

Each of the two engagement blocking means controlled by the valve 26 comprises a rotary valve (27V and 27R), a blocking valve (28V and 28R), and an auxiliary piston (29V and 29R) in the cylinder of the main clutch servo-valve 25.

The conduits containing pressure fluid when the device is set for forward (V) drive are shown by heavy solid lines, the spaces in the cylinder and valves containing pressure fluid when the device is set for forward (V) drive are horizontally shaded. The conduits containing pressure fluid when the device is set for reverse (R) drive are indicated by heavy dotted lines. Auxiliary conduits which are under pressure only temporarily, during synchronization and possibly during actuation of the engagement blocking means are indicated by thin dotted lines. The solid line arrows show the direction of rotation of the transmission wheels and the movement of the valves 18V, 18R, 22, and 24 for forward drive, whereas the heavy dotted line arrows indicate the movement of these elements for reverse drive. The light dotted line arrows indicate the movement of the blocking valves 28V and 28R and the synchronizing rotation of the wheels 16, 17, 7, 6. The center line M—M indicates the middle position of the piston 18 and of the valves 28, 24, and 22 when the device is set for idling or stop according to the position "L" of the selecting lever 21.

The following is a description of the pressure fluid conduits:

The pressure fluid is pumped into a conduit 30 by means of a pump, not shown, which may be driven by the main engine. Pressure fluid is supplied from the conduit 30 through a pipe 31 to the main pressure blocking valve 23 and through a pipe 32 to the reversing valve 24. A pipe 33 also connected with the main conduit 30 supplies pressure fluid to the main clutch servo-valve 25 and a pipe 34 supplies pressure fluid from the conduit 30 to the engagement blocking valve 26. The main pressure fluid conduits 30 to 34 are shown by heavy solid lines, arrows indicating the flow of pressure fluid into the devices which are supplied by these conduits.

The main pressure fluid blocking valve 23 is connected with the center of the cylinder 22' for the selecting valve 22 by means of a conduit 35, conduits 36V and 36R connecting the cylinder 22' with the spaces at the left end and at the right side, respectively, of the valve 24 in the cylinder 24'. According to the invention conduits 37V and 37R connect the cylinder 24' with the blocking valves 28V and 28R, respectively. The valves 28V and 28R are connected by means of pipes 38V and 38R, respectively, with the spaces in the cylinder 19 at the left side and at the right side, respectively, of the piston 18. A conduit 39V returns pressure fluid from the left side of the cylinder 19 to the selecting valve 22, a conduit 39R returning pressure fluid from the right side of the cylinder 19 to the valve 22. Conduits 40V and 40R connected with the left and right side, respectively, of the cylinder 22' are connected with a conduit 41 terminating in the pressure chamber between the main clutch servo-valve 25 and the auxiliary piston 29V in the cylinder 25'. The servo-valve 25 controls the flow of pressure fluid from the conduit 33 into a conduit 42 which terminates in a space 42' in the casing 74, forming part of the main driving shaft, at the left side of a piston member 75 actuating the main clutch 4.

A conduit 43 connects the pressure space above the main clutch servo-valve 25 with the pressure space below the engagement blocking servo-valve 26. The latter controls flow of pressure fluid from the conduit 34 to a conduit 44 which is connected with the chambers at the right side of the rotary blocking valves 27V and 27R. The latter control flow of pressure fluid through pipes 45V and 45R, respectively, to the spaces at the end faces of the blocking valves 28V and 28R, respectively, for moving these valves toward the center of the cylinder 28' into blocking position and conducting pressure fluid through the conduits 46V and 46R into a pressure space above the auxiliary pistons 29V and 29R, respectively, of the main clutch servo-valve 25.

Conduits 47V and 47R are connected with the spaces at the left end and at the right end, respectively, of the pistons 18V and 18R, the conduits 47V and 47R being united in a conduit 48 communicating with the space in the casing 74 at the left side of a piston 76 adapted to actuate the synchronizing clutch 15. A conduit 49 connects the conduits 47V and 47R with the pressure space at the left side of the main pressure blocking valve piston 23.

The following is a description of the control valves according to the invention:

The selecting valve 22 has two annular recesses 50V, 51V and 50R, 51R and two relief openings 52R, 53R and 52V, 52R at either side of a central collar.

The main fluid pressure blocking valve 23 is provided with a return spring 54 and an annular recess 55 from which pressure fluid may be relieved through an outlet 56. The valve 23 is preferably located in the same body in which the selecting valve 22 is located.

An annular recess 57V is provided at the left side of a central collar of the reversing valve 24, an annular recess 57R being provided at the right side of the central collar of the valve 24. The pressure fluid can be relieved from these recesses through outlets 58R and 58V, respectively. To prevent undesired movement of the valve 24 safety pistons 59V and 59R are provided in respective bores in the left and in the right end portion, respectively, of the valve 24. The bores communicate individually with the recesses 57V and 57R. The ends of the pistons 59V and 59R which project from the valve member 24 abut individually against the inner end walls of the cylinder 24'.

The main clutch servo-valve 25 which is controlled, inter alia, by the auxiliary pistons 29V and 29R is provided with a return spring 60 and an annular recess 61 which can be connected through the conduit 42 with the main clutch 4. The pressure fluid in the conduit 42 can be relieved through an outlet 62 in the cylinder 25' containing the valve 25 and the pistons 29V and 29R, when the valve 25 is in its upper position.

The engagement blocking servo-valve 26 is provided with a return spring 63 and an annular recess 64 from which pressure fluid can be relieved through an outlet 65.

The blocking valves 28V and 28R have a symmetric configuration and are both located in the cylinder 28'. A spring 66 provided between the valves 28V and 28R tends to move the valves apart into unblocking position. Each valve 28V and 28R has two annular recesses 67V, 68V and 67R, 68R, respectively. The pressure fluid can be drained from the recesses 67V and 67R through outlets 69V and 69R, respectively, and the pressure fluid from the recesses 68V and 68R can be drained through outlets 70V and 70R, respectively.

The valves 18V and 18R extending from the piston 18 are each provided with three symmetrically located annular recesses 71V, 72V, 73V and 71R, 72R, 73R, respectively. The recesses 71V and 73V are interconnected by a bore 74V in the valve member 18V and the recesses 71R and 73R are interconnected by a bore 74R in the valve member 18R. The recesses in the valve member 18V cooperate with a control edge 75V in the cylinder 19 and the recesses in the valve member 18R cooperate with a control edge 75R in the cylinder 19. The movement of the piston 18 is limited by abutments 76R and 76V.

The rotary blocking valves 27V and 27R are individually provided with friction discs 77V and 77R, respectively, cooperating with friction discs 78V and 78R on the ends of shafts 79V and 79R, respectively. The shafts 79V and 79R are connected with the driving wheels 6 and 7, respectively. Each of the friction discs 77V and 77R is provided with two abutments 80V, 81V and 80R, 81R, respectively, the abutments cooperating with abutments 82V and 82R, respectively, in the inside of the valve housings 83V and 83R, respectively. The friction clutches 77V, 78V and 77R, 78R are held in engagement by springs 84V and 84R in the valve housings 83V and 83R, respectively, the springs pressing against the right end faces of the valve members 27V and 27R, respectively. Longitudinal grooves 85V and 85R corresponding to blocking position and to the abutments 80V and 80R extend along the end portions of the valve member 27V and 27R, respectively. Bores 86V and 86R in the housings 83V and 83R, respectively, extend into the region of the grooves 85V and 85R, respectively, the radial bores 86V and 86R communicating with an annular inside cavity of slip rings 87V and 87R, respectively, placed around the housings 83V and 83R, respectively. Longitudinal grooves 88V and 88R corresponding to unblocking position and to the abutments 81V and 81R and placed along the inner portions of the valve members 27V and 27R, respectively, connect the bores 86V and 86R, respectively, with outlets 89V and 89R in the housings 83V and 83R, respectively. The abutments 80V to 82V and 80R to 82R permit a limited relative rotation of the driving parts and of the driven parts of the reversing clutches. Depending on the direction of relative angular movement of the driving side and of the driven side either the abutments 80V and 80R or the abutments 81V and 81R rest on the abutments 82V and 82R, respectively, in the valve housings 83V and 83R, respectively.

The drawing illustrates the apparatus in the position for forward drive, the selecting lever 21 being in the position "V" and the driven shaft 3 rotating in the same direction as the drive shaft 1. The transmission gears and shafts rotate in the direction of the solid line arrows, the reversing piston 18 and the valves 22 and 24 being in the right end position indicated by solid line arrows.

When the selecting lever 21 is in the position "R" for driving in reverse, the clutch 11R, 12R is engaged instead of the clutch 11V, 12V. The direction of rotation of the transmission gears and the position of the reversing piston 18 and of the valves 22 and 24 are indicated by the heavy dotted line arrows. The conduits shown by heavy dotted lines are under pressure.

The valves 23, 25, 26, 28V and 28R are in the same position for forward as well as for reverse drive.

When changing from one driving direction to the opposite direction the means for blocking engagement do not operate because the driven side of the clutch to be engaged runs always so that the clutch halves reject each other when engagement of the clutch is attempted. The rotary blocking valves are in the illustrated position when the apparatus is in condition for forward drive. When the apparatus is set for reversed drive the valve 27R is in unblocking position, the abutments, however, being angularly spaced to the extent defined by the length of the passing travel of the clutch halves. The valve 27V is also in unblocking position, the abutments, however, being in abutting position.

At the beginning of the passing movement of the clutch halves, the direction of the relative rotation of the clutch halves is reversed in the locking sense. The relative passing path is not longer than the distance between the centers of two claws of the same clutch half whereas the width of the grooves 85V, 85R, and 88V and 88R is so great and the abutments 80V, 80R, 81V and 81R on the rotary valve members 27V and 27R are so arranged that blocking position is not effected before an angular movement which is greater than the longest possible passing path, i. e. not before the range of the opposite rotation or blocking range has been reached.

Movement of the selecting lever 21 from position "V" to position "R" has the following effect: The selecting valve 22 is moved to the left, causing blocking of the pipe 40V so that there is no pressure in the pipe 41 and in the space above the main clutch servo-valve 25. The spring 60 moves the valve 25 into its upper end position, so that the recess 61 no longer passes pressure fluid from the conduit 33 into the conduit 42 and into the main clutch 4 and the latter is pushed out of engagement by the spring 90.

The recess 50V of the selecting valve 22 is simultaneously moved to communicate with the outlet 52R, relieving pressure fluid from the conduit 36V. Pressure fluid can now flow from the conduit 35 through the recess 50R into the conduit 36R and into the space in the cylinder 24' at the right end of the reversing piston 24, moving the latter to the left. Pressure fluid from the pipe 32 flows through the recess 57R into the bore in the right side of the valve 24, pressing the piston 59R outwardly and into its right abutting position. The pressure fluid in the recess 57V which also acts on the piston 59V flows out through the outlet 58R. There is no pressure in the conduit 37V, in the recess 67V of the valve 28V, and in the space at the left side of the reversing piston 18. No pressure fluid passes from the space at the left side of the piston 18 through the recess 72V and the conduit 39V to the selecting valve 22. Pressure fluid is also relieved from the conduit 39V through the recess 50V and the outlet 52R. Therefore the spring 20 can move the lever 13 clockwise and disengage the clutch half 12V from the clutch half 11V, moving both clutch halves 12V and 12R into middle or neutral position. The piston 18 is simultaneously moved into its middle or neutral position.

There is no pressure in the pipe 43 which is supplied from the pressure space above the valve 25 and there is consequently no pressure below the engagement blocking servo-valve 26 so that the spring 63 can move the valve 26 into its extreme lower position. The recess 64 in the valve member 26 connects the main pressure fluid supply conduit 34 with the conduit 44, supplying pressure fluid into the casings 83V and 83R for the rotary blocking valves 27V and 27R, respectively.

Since the driven side of the transmission still rotates in the "V" direction (solid line arrows) the rotary blocking valve 27 which controls the clutch 11R, 12R for reverse drive remains in the illustrated unblocking position so that the pressure fluid coming from the conduit 44 cannot flow from the casing 83R and the blocking valve 28R is retained by the spring 66 in unblocking position.

Pressure fluid flows through the recess 57R on the reversing valve 24, the conduit 37R, the recess 67R on the locking valve 28R, and the conduit 38R into the space at the right of the reversing piston 18. The latter, which has already been moved by the spring 20 into its middle position, is now moved farther to the left by the pressure fluid so that the lever 13 is turned clockwise and the clutch half 12R is moved onto the clutch half 11R, the inclined faces of the claws of the members 12R and 11R sliding on and rejecting each other.

The recess 71R of the valve member 18R is now at the edge 75R so that pressure fluid can flow from the space at the right of the piston 18 through the bores 74R, the recess 73R, and the conduits 47R and 48 into the space at the left of the member 76 for engaging the synchronizing clutch 15.

The synchronizing drive 15—14—16—17—7 initiated by the engagement of the clutch 15, which drive, at first, continues to rotate in the previous direction, is now connected to the drive shaft 1 by means of the clutch 15. After coming to a standstill, the direction of rotation of the synchronizing drive is reversed and rotates in the direction of the thin dotted line arrows inscribed on the wheels 16, 17, 7. The clutch half 11R which was rotating in the direction of the solid line arrow begins to overtake the respective clutch half 12R which continues to rotate in the direction of the solid line arrow. The inclined faces of the claws of the clutch half 11R can slide only one claw pitch along the inclined claw faces of the mating clutch half 12R in the direction of the thin dotted line arrow before engagement of the claw flanks.

When the synchronizing drive is in operation, pressure fluid is conducted through the conduit 49 from the conduit 47V into the pressure chamber at the left of the main pressure blocking valve 23, moving the later to the right against the pressure of the spring 54. The recess 55 is now within reach of the relief opening 56 and is moved beyond the mouth of the pressure fluid conduit 31. Therefore, there is no pressure fluid supplied through the conduit 35 to the selecting valve 22 as long as the recess 73R on the valve member 18R is within reach of the mouth of the conduit 47R.

Because of the axial movement of the clutch half 12R to the left for sliding engagement of the inclined faces of the claws of the clutch half 12R with those of the clutch half 11R, the recess 73R is moved out of the reach of the mouth of the conduit 47R. There is, therefore, no pressure in the space at the left side of the piston 76 for the synchronizing clutch 15 and of the main pressure blocking piston 23. The clutch 15 is disengaged by the action of a spring 91 and the main pressure blocking piston 23 is moved by means of the spring 54 from the blocking position into a position in which the recess 55 in the piston 23 connects the conduits 31 and 35 so that the main fluid pressure is again available at the selecting piston 22.

During the rest of the engaging movement of the clutch half 12R, the recess 72R in the middle of the valve member 18R reaches the control edge 75R in the reversing cylinder 19 and connects the chamber at the right of the reversing piston 18 with the conduit 39R which is connected with the selecting valve 22.

The final switching pressure prevailing in the conduit 39R at the end of the switching operation is transmitted through the recess 51R to the conduits 40R and 41 to the pressure chamber above the main clutch servo-valve 25 so that the latter is moved downwardly against the action of the spring 60. The recess 61 connects the main pressure conduit 33 with the conduit 42 which is connected with the main clutch 4. The latter is engaged and gradually brakes the transmission parts which are still running in the "V" direction and reverses the direction of rotation of these parts to the "R" direction which is indicated in the drawing by heavy dotted line arrows.

The pressure in the pressure chamber above the main clutch servo-valve 25 acts simultaneously through the conduit 43 in the pressure chamber of the engagement blocking servo-valve 26, moving the latter upwardly against the pressure of the spring 63. This causes relief of the pressure in the recess 64 through the outlet 65 and blocking of the main pressure from the conduit 34. The pressure disappears from the housings 83V and 83R of the rotary blocking valves 27V and 27R, respectively.

This completes the reversing operation so that the driven shaft 3 is now driven by the members 5, 6, 7, 11R, 12R, 10, and 8. With the device according to the invention, reversing requires only a fraction of a second.

The engagement blocking device for the "V" clutch 11V, 12V operates as follows: the device was in blocking position because the rotary valve 27V rotated more slowly due to the slowing up of the driving gears 5, 6, 7, and because the driven gears 8, 9, 10 continued to rotate in the direction of the solid line arrows. The abutment 82V was resting against the abutment 80V so that the blocking groove 85V was in the blocking position and permitted flow of pressure fluid from the housing 83V through the conduit 45V to the left end face of the blocking valve 28V, interrupting the connection of the conduits 37V and 38V with the chamber at the left of the reversing piston 18. This action is really not necessary because the reversing valve 24 does not furnish pressure fluid to the left side of the piston 18 anyway. The synchronizing drive held the rotary blocking valve 27V in the blocking position and retained it in this position until complete engagement of the clutch 11R, 12R. Engagement of the main clutch 4 effects reversing of the relative direction of rotation of the driving and driven side to follow the heavy dotted line arrows, moving the rotary blocking valve 27V into the unblocking position. The blocking valve 28V which was in the blocking position can now be returned to its left end position by the spring 66.

As explained above the rotary blocking valves 27 do not affect the change of rotation of the driven side of the transmission from one direction to the opposite direction. In the illustrated embodiment of the invention, the engagement blocking devices are provided for blocking engagement of the clutches 11V, 12V and 11R, 12R as long as the halves of the clutch to be engaged rotate in the same direction and the claws of one half do not reject the claws of the other half and as long as the rotational speed of the driven clutch half is greater than that of the driving clutch half. Both halves of the clutch to be engaged rotate in the same direction when it is desired that the vehicle continue to move in the same direction in which it moved previously.

This operating condition prevails also when the driven side of the transmission is in motion and the driving side does not move. This is the case in single engine plants when the driven side of the transmission is moved by currents, in the case of a vessel, or coasting, in the case of a vehicle. It is also the case in multi-engine plants when one or more engines maintain movement of the vessel or vehicle and an additional engine or additional engines is or are put to work for increasing the speed of the vessel or vehicle. If a claw clutch is engaged under such circumstances, the points of the claws of one clutch half knock against the points of the claws of the other clutch half, causing damage of the claws. Under these conditions the engagement blocking devices are ineffective, when the claw clutches are engaged for reversing the direction of movement of the vessel or vehicle.

If the driven side of the transmission whose clutches are in the neutral position (position "L" of the selecting lever 21) is rotated in the direction of the solid line arrows, for example, by the propeller of a vessel and it is desired that the engine furnishes drive in the "V" direction, the mechanism operates as follows: The driving gears 5, 6, 7 stand still. Consequently, the extension 79V of the wheel 6 and the friction clutch half 78V are also at rest. The latter tends to arrest the mating clutch half 77V which is actuated by the spring 84V. Since the driven parts including the wheel 9 rotate in the direction of the solid line arrows inscribed in these parts the abutment 82V on the inside of the casing 83V abuts against the abutment 80V on the friction clutch half 77V. This causes communication of the groove 85V on the rotary blocking valve 27V with the bore 86V.

The engine driving the shaft 1 is started prior to shifting of the selecting lever 21 from the position "L" to the position "V." Main fluid pressure is available in the conduit 30 and in the conduits 31 to 34, branching therefrom. Since the selecting lever 21 which is in the position "L" holds the selecting valve 22 in the middle position, the fluid pressure acting through the recess 55 of the main pressure blocking valve 23 and through the conduit 35 connected with the cylinder 22' is ineffective because the selecting valve 22, being in its middle position, blocks the conduits 35 and 39V as well as 39R and all outlets 53R, 52R, 52V, and 53V are open.

The servo-valve 26 for the engagement blocking means is pressed by the spring 63 into the extreme low position so that pressure fluid flows from the conduit 34 through the recess 64 into the conduit 44 to the casings 83V and 83R of the rotary blocking valves 27V and 27R, respectively. Pressure fluid can flow from the blocking groove 85V of the valve 27V, which controls the clutch 11V, 12V which is intended to be engaged, through the bore 86V, the slip ring 87V, and the conduit 45V to the left end face of the blocking valve 28V, moving the latter against the action of the spring 66 against an abutment in the middle of the cylinder 28'. The rotary blocking valve 27R is in unblocking position and cannot pass pressure fluid.

The pressure fluid, however, which flows through the conduit 32 to the reversing valve 24 can flow through one of the recesses 57V or 57R, depending on the position of the valve 24 and can initiate engagement with the one of the claw clutches which corresponds to the last position of the selecting valve 22 and to that of the valve 24, provided the respective blocking valve 28V or 28R does not prevent engagement of the claw clutch.

If the reversing valve 24 is still in its right end position, which corresponds to the "V" position, to which the lever 21 is intended to be moved, the main fluid pressure available from the conduit 32 does not flow through the recess 57V of the reversing valve 24 and through the conduit 37V leading to the blocking valve 28V, which abuts against the abutment in the middle of the cylinder 28', and through the recess 67V but flows through the recess 68V into the conduit 46V. The latter terminates between the pistons 29R and 29V above the main clutch servo-valve 25. This causes downward pressing of the piston 29V and consequently of the valve 25 into a position in which the recess 61 connects the conduits 33 and 42. Conduit 42 conducts pressure fluid to the main clutch 4, engaging the latter. The gears 5, 6, 7 are temporarily rotated in the direction of the inscribed solid line arrows. The driving side gradually reaches and exceeds the speed of the driven side of the transmission, provided that there is sufficient light running speed. The relative rotation of the driving and driven sides of the transmission is thereby reversed, moving the rotary valve 27V into unblocking position in which the abutment 81V rests on the abutment 82V. The blocking groove 85V is thereby removed from its effective position and the unblocking groove 88V relieves pressure fluid from the conduit 45V through the bore 89V. The blocking valve 28V is returned by the spring 66 from the blocking position into its left end position. The pressure from the conduit 37V does not act any more on the main clutch 4, pressure fluid flowing through the recess 67V, and through the conduit 38V into the space at the left of the reversing piston 18, moving the latter from its middle position to the right. This causes movement of the clutch half 12V to the left until the claws of this half are rejected by the claws of the clutch half 11V. Now, the synchronizing drive 1, 15, 14, 16, 17, 7, 6 begins to move, causing reversal of the relative rotation of the clutch halves 11V, 12V without completely moving the rotary blocking valve 27V from the unblocking position, because the reversal of the relative rotation can extend at the most within one claw pitch. At this time, the main pressure blocking valve 23 is in blocking position but has no effect because the selecting valve 22 is still in its middle position corresponding to the position "L" of the selecting lever 21. The synchronizing clutch is disengaged and the clutch 11V, 12V is completely engaged. The driven side of the transmission rotates not only the gears 8, 9, 10, but the whole transmission in the "V" direction.

Movement of the lever 21 from the position "L" to the position "V" therefore produces only the following effect: The pressure fluid flowing from the conduit 31 through the valve 23, which is in unblocking position, flows through the conduit 35, the recess 50V, and through the conduit 36V to the left side of the reversing valve 24, which is still in its right end position and is held in this position by means of the little piston 59V which is under fluid pressure from the conduit 32. Movement of the selecting valve 22 to the "V" position confirms, so to speak, the operation which has been effected in the meantime.

The recess 51V on the selecting valve 22 has been moved to communicate with the conduit 40V so that the end pressure of the shifting operation in the reversing cylinder 19 can be transmitted from the conduit 39V through the conduits 40V and 41 into the main clutch servo-valve cylinder 25', effecting engagement of the main clutch 4, and through the conduit 43 into the engagement blocking device servo-valve 26 for pressing the valve upwards and interrupting flow of pressure fluid to the rotary blocking valves 27.

If the reversing piston 24 is not in the position for effecting the desired direction of motion of the vessel or vehicle, shifting is initiated corresponding to the position of the valve 24 which is reversed upon shifting of the lever 21.

If the reversing piston or valve 24 was moved accidentally to middle position, for example, by the vibrations of the vehicle and if the collar in the middle of the valve blocks supply of pressure fluid from the conduit 32, no shifting can be effected in the reversing cylinder 19. The valve 24 cannot move to one of its end positions until the selecting valve 22 is moved from the position "L" to "V" or "R," causing flow of pressure fluid to one of the end faces of the reversing piston 24.

If shifting from "L" to "R" is desired while the engine is running, and the driven side of the transmission rotates at a greater speed than the driving side, the driven side running in the "V" direction, the shifting operation is like a reversing operation, if the valve 24 happened to be in the "V" position.

Since the relative rotation of the friction clutch halves 77, 78 controls the position of the blocking grooves 85 and of the unblocking grooves 88, the position of the engagement blocking valves before initiation of a shifting operation is immaterial. The friction clutch halves 77, 78 are, at first, always so positioned by either the driving or the driven side of the transmission, or by both sides, while the vessel or vehicle is at rest or is moving, that knocking of the claws of one half of a claw clutch 11, 12 against the claws of the other half of the claw clutch is prevented.

The foregoing description of various shifting operations shows that any movement of the selecting lever 21 during synchronization and the sliding of the claws of one half of a claw clutch along the claws of the other half during the overtaking phase until the claw flanks are fully engaged remains without effect. If, meanwhile, the selecting lever 21 is shifted again, the shifting operation begins once more in the same manner, without full engagement of the reversing clutch, the reversing valve 24 being shifted first so that the shifting presure changes from one side of the reversing cylinder 19 to the other side, if the blocking valves 28 permit this.

The valves 22 and 28 need not be arranged symmetrically as shown in the drawing. Symmetric arrangement with respect to the center line M—M has been used in the diagrammatic illustration to facilitate interpretation of the drawing.

The arrangement and dimensions of the rotary blocking valves 27 and their housings 83 depends on the number of claws and on the pitch of the claws of the clutches 11, 12. For simplifying the drawing only four claws have been shown on each clutch so that a great angle of rotation is required for shifting the mechanism from the blocking to the unblocking position.

What is claimed is:

1. An apparatus for controlling the pressure fluid of a pressure fluid operated reversible transmission including a main shaft, an intermediate shaft, a pressure fluid actuated main clutch operably interposed between said main shaft and said intermediate shaft, a driven shaft, a main reversing gearing interposed between said intermediate shaft and said driven shaft, a forward drive clutch operably interposed between said intermediate shaft and said driven shaft, a reversing clutch operably interposed between said main reversing gearing and said driven shaft, operating means connected with said forward drive clutch and with said reversing clutch for alternately engaging one and disengaging the other of said last mentioned clutches, a synchronizing reversing gearing operatively connected with said main reversing gearing, a fluid pressure actuated sychronizing clutch operably interposed between said main shaft and said synchronizing reversing gearing for temporarily reversing the direction of rotation of the driving parts of said forward drive clutch and of said reversing clutch, the apparatus for controlling the pressure fluid for actuating the aforesaid transmission comprising a hydraulic cylinder containing an actuating piston which is connected with said operating means for alternately engaging and disengaging said forward drive clutch and said reversing clutch, first valve means connected with said actuating piston for controlling flow of pressure fluid to said synchronizing clutch when said piston is in a predetermined position, a pressure fluid actuated reversing valve connected with said hydraulic cylinder for controlling flow of pressure fluid to one side or to the other side of said actuating piston, a manually operable drive direction selecting valve connected for fluid flow with said reversing valve for actuating the latter, second valve means connected with said actuating piston for controlling flow of pressure fluid to said selecting valve and to said main clutch for engaging the latter when said actuating piston is in one of its end positions, and a third valve means for controlling flow of pressure fluid to said selecting valve, said last mentioned valve means being operably connected with said synchronizing clutch for actuation by the same fluid pressure which engages said synchronizing clutch for interrupting flow of pressure fluid to said selecting valve when said synchronizing clutch is engaged.

2. An apparatus as defined in claim 1, in which said third valve means is a slide valve adapted to be actuated by pressure fluid and a pressure fluid conduit is connected with said third valve means and with said synchronizing clutch.

3. An apparatus according to claim 2, said third valve means including a spring counteracting the pressure of the fluid actuating said third valve means for returning said third valve means into the position in which the flow of pressure fluid to said selecting valve is not interrupted when there is no fluid pressure actuating said synchronizing clutch and said synchronizing clutch is disengaged.

4. An apparatus according to claim 2 including resilient means connected with said operating means for yieldably holding said forward drive clutch and said reversing clutch in neutral position, pressure fluid flow conduits individually connecting said reversing valve with the spaces in said hydraulic cylinder at the sides of said piston, a pressure fluid operable blocking valve interposed in each of said last mentioned conduits for controlling the flow of pressure fluid therethrough, a rotary valve connected with said forward drive clutch and a rotary valve connected with said reversing clutch, said rotary valves being individually responsive to the direction of relative rotation of the driving part and of the driven part of the respective clutch with which the rotary valve is connected, said rotary valves being individually connected for pressure fluid flow with said pressure fluid flow blocking valves for operating the latter and blocking flow of pressure fluid to said hydraulic cylinder for preventing engagement of the selected one of said forward drive clutch and of said reversing clutch upon relative rotation of the driving and driven parts of the selected clutch in one direction and for permitting engagement of the selected clutch when the direction of said relative rotation is reversed.

5. An apparatus according to claim 4 including a pressure fluid operable main clutch servo-valve for controlling the flow of pressure fluid to said main clutch, and conduits connecting said blocking valves with the said servo-valve for conducting pressure fluid to said servo-valve when one of said blocking valves is in blocking position and moving said servo-valve to permit flow of pressure fluid to said main clutch.

6. An apparatus according to claim 4 including a housing for both of said blocking valves, and a spring connected with both blocking valves for pressing said valves into unblocking position.

7. An apparatus according to claim 4, in which said reversing valve includes a valve cylinder having an inlet port and two outlet ports for conducting pressure fluid to said hydraulic cylinder, a valve piston member reciprocable in said cylinder and having two annular recesses for individually connecting said inlet port with one of said outlet ports, the spaces in said valve cylinder at the ends of said valve piston being individually connected with said selecting valve for receiving pressure fluid therefrom for actuation of said valve piston, a bore in each end portion of said valve piston, said bores individually communicating with said recesses, a safety piston movable in each of said bores and having an end portion projecting from said valve piston, said valve cylinder having interior end walls individually abutted by said projecting ends of said safety pistons for maintaining said valve piston in the selected position by the pressure of the fluid in the respective recess.

References Cited in the file of this patent
UNITED STATES PATENTS
2,762,230    Meyer _____ Sept. 11, 1956